Dec. 30, 1969     T. R. SOWDER ET AL     3,486,462
TRAM CARRIER STABILIZER
Filed May 2, 1966
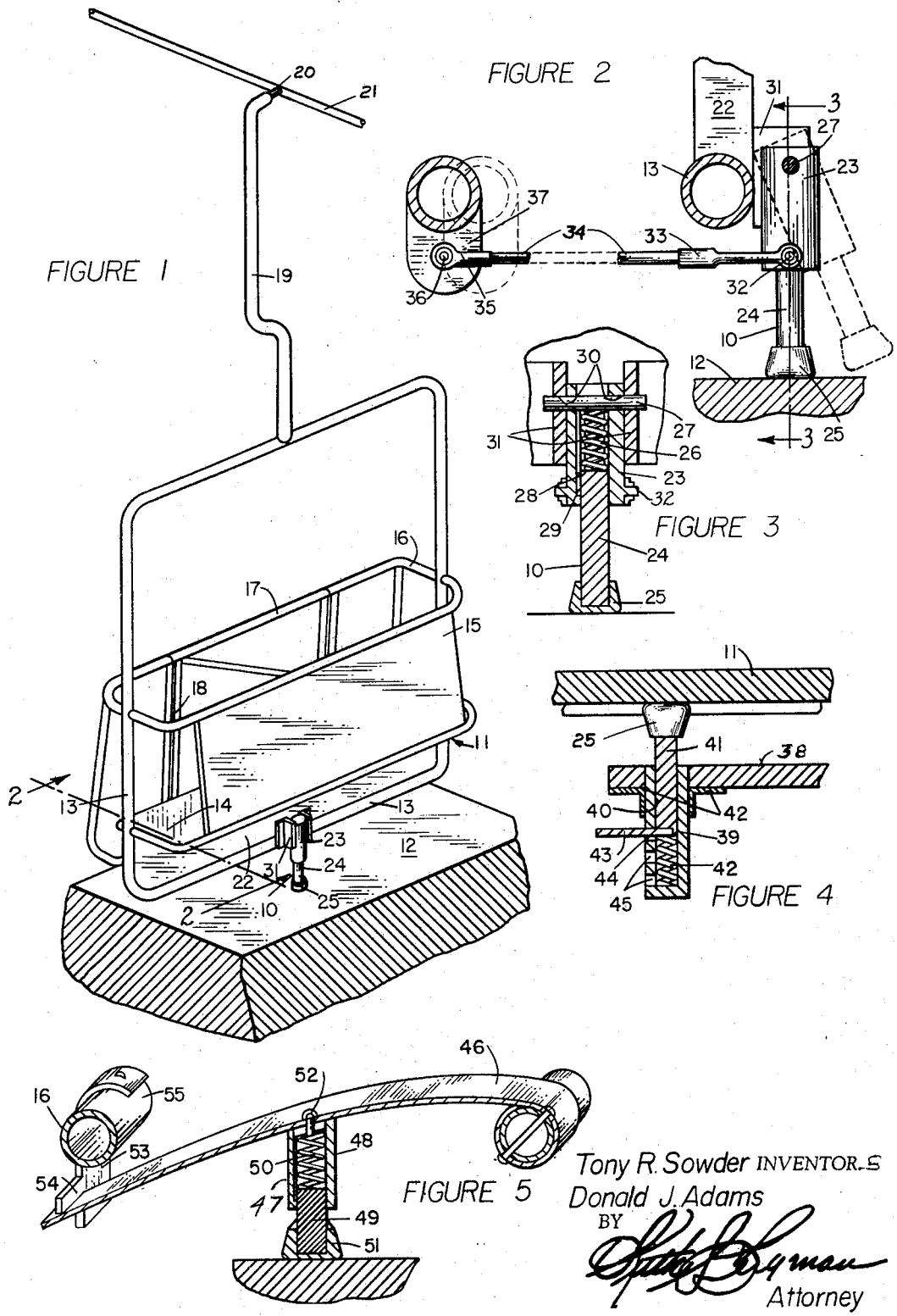
Tony R. Sowder INVENTORS
Donald J. Adams
BY
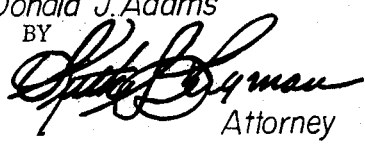
Attorney //United States Patent Office

3,486,462
Patented Dec. 30, 1969

3,486,462
TRAM CARRIER STABILIZER
Tony R. Sowder, E. 814 Grace Ave., Spokane, Wash. 99207, and Donald J. Adams, 16041 37th Ave. NE., Seattle, Wash. 98105
Filed May 2, 1966, Ser. No. 547,027
Int. Cl. B61b 7/12; B61c 11/02; B60t 1/14
U.S. Cl. 104—173   4 Claims

ABSTRACT OF THE DISCLOSURE

A movable mechanical linkage extendable to communicate between a tram carrier and a supporting surface therebeneath to stabilize the carrier during loading. The mechanical linkage may be carried by the tram carrier or the underlying support surface. Particular embodiments disclose an extensible piston.

---

This invention relates generally to a means for stabilizing a tram carrier and more particularly to apparatus that is adapted to stabilize a tram passenger carrier in a horizontal plane, relative to an underlying support surface, during the loading operation.

The carriers on a flexible rope-type aerial tramway, mechanically, are essentially pendulums, relatively free to oscillate in a plane perpendicular to the direction of travel of the tram, being restrained only by the torsional forces in the rope carrying them. Oscillation in a plane parallel to the direction of travel of the tram is substantially restrained by tension forces in the supporting rope, though, even in this dimension, there is some motion. With passenger carriers that are stopped during loading operations, the actual motion of the carrier causes many physical problems and the potential motion many psychic ones.

The problem seems not to have been dealt with too extensively in the past, though some solutions have appeared. Principal among these has been a loading platform with an edge parallel to the direction of carrier travel and positioned at a spaced distance therefrom to allow normal passage of the carrier thereby. Though the principal purpose of such a carrier is probably to aid in getting into or out of the carrier, it does serve the purpose of restraining the carrier from motion in a direction toward the barrier, though it has little or no effect on motion in other directions. In a few instances two such barriers have been established at appropriately spaced distances and a carrier allowed to pass therebetween. This form of restraint stops motion in the direction of either barrier, but it has not proved particularly feasible because to be effective it must be close to the carrier side and if it is close, it commonly fouls the carrier in its normal progressive motion.

With this background in mind the instant invention was conceived to provide a new and novel carrier stabilizer for passenger trams without the limitations of those known in the prior art. In so doing it is:

A principal object of our invention to provide a moveable stabilizing arm adapted to maintain a tram carrier in a fixed position with reference to motions in a horizontal plane parallel to an underlying surface.

It is a further object of our invention to provide a device of the nature aforesaid that may be carried either by a supporting surface or the tram carrier.

It is a still further object of our invention to provide a device of the nature aforesaid that may be operatively associated with safety restraining rails or similar structural members of a tram carrier to operate, or be placed in an operative position, thereby.

It is a still further object of our invention to provide a device of the nature aforesaid that may be operated by a tram passenger or by an attendant, external to the tram carrier.

It is a still further object of our invention to provide a device of the nature aforesaid that is of new and novel design, of sturdy and economic construction, of simple manufacture and otherwise well adapted to the uses for which it is intended.

These and other objects of our invention will become apparent from consideration of the following specification and accompanying drawings. In carrying out the objects of our invention, however, it is to be understood that its essential features are susceptible of change in design, ordering and structural arrangements, with only preferred practical embodiments being illustrated as required.

In the accompanying drawings wherein like numbers of reference refer to similar parts throughout:

FIGURE 1 is an isometric view of a typical common variety of tram passenger carrier, with one specie of our invention illustrated in place thereon to support the device over an underlying support surface.

FIGURE 2 is a partial cross-sectional view of the device illustrated in FIGURE 1, taken on the line 2—2 in the direction indicated by the arrows thereon, showing the further structure and operation of the invention.

FIGURE 3 is a cross-sectional view of the invention of FIGURE 2, taken on the line 3—3 in the direction indicated by the arrows thereon, further showing the internal detail and structure from this aspect.

FIGURE 4 is a second specie of our invention adapted to be carried within the underlying support surface to stabilize a tram carrier thereabove.

FIGURE 5 is a third specie of our invention embodying a leaf type spring adapted to be carried by the passenger carrier and operated preferably by an attendant.

Referring now to the drawings in more details and particularly to that of FIGURE 1, it will there be seen that our invention encompasses broadly a mechanical support retractably extending between tram carrier 11 and underlying supporting surface 12 to provide a frictional engagement between these two relatively moveable members. The specie of the invention illustrated in FIGURE 1, and that illustrated in FIGURE 5, are carried by the tram carrier and provide frictional engagement with the underlying surface; the specie of the invention illustrated in FIGURE 4 is carried by the underlying supporting surface and provides frictional engagement with the underside of tram carrier 11 thereabove.

A common type of passenger carrier for flexible rope trams is illustrated in FIGURE 1. It includes support frame 13 structurally carrying seat 14, back 15, and peripheral safety support 16, having entrance gate 17 pivotably mounted on pin 18. Supporting frame 13 structurally communicates with carrier arm 19, which in turn communicates with cable support member 20, positioning the carrier upon traction cable 21. Preferably panel 22 fills the area in the plane of supporting frame 13, below the under-surface seat 14. This basic structure is common with most passenger-type tram carriers, though some also include a peripheral cover of one sort or another associated with peripheral safety support 16 or replacing it.

Underlying support surface 12 is normally a prepared loading surface of concrete or similar material, though it could be the unprepared surface of the earth itself.

The mechanical support of the specie of invention shown in FIGURE 1 is illustrated in detail in the cross-sectional view of FIGURE 3, where it is seen to comprise housing 23 slidably supporting extensible rod 24 therein. This rod carries foot-like cap 25 in its lowermost extension to provide an increased frictional surface. Compression spring 26 extends in the housing chamber between the innermost surface of rod 24 and supporting pin 27 to bias the rod to an extended position. Pin 28, carried by the upper portion of rod 24, slideably moves within channel 29 of housing 23 to prevent the rod from passing out of the central chamber of the housing.

Supporting pin 27 communicates through housing 23 with appropriate holes 30 in paired opposed supporting ears 31 carried by the lowermost medial parts of frame 13 and panel 22, preferably on a vertical line through the center of mass of carrier 11, but at least substantially laterally centered.

The lower portion of housing 23 has paired diametrically opposed pins 32 pivotably communicating with yoke 33. This yoke threadedly communicates with rod 34 which in turn communicates with forward yoke 35, pivotably carried by pin 36 mounted in depending ears 37 on the lower member of safety support frame 16. With this linkage, when entrance gate 17 is closed support 10 will be pivoted rearwardly to a position where it may not communicate with underlying supporting surface 12, but when the gate will be opened, the member will be moved forwardly to a substantially vertical position until it communicates with surface 12. When the gate is opened, if support 10 is not substantially vertical, it will create some friction by reason of contact of foot 25 with the upper surface of support 12 and a slight motion of the carrier rearwardly by the operator will bring support 10 to a vertical, supporting position.

Obviously, to accomplish the aforesaid ends, the various parts involved must be appropriately dimensioned. Also tension spring 26 must be such and the length of rod 24 appropriate to maintain frictional engagement of foot 25 with supporting surface 12 with some degree of force appropriate for existing conditions. It is also convenient, that angle support 31 be such as to limit the forward rotary motion of mechanical support 10 to a substantially vertical position.

From what has been described, it appears that the only essential feature of our invention is the releaseable support between surface 12 and tram carrier 11; this obviously may be accomplished by other mechanisms.

The specie of invention illustrated in FIGURE 4 provides a movable support carried within an appropriately constructed supporting surface. Here supporting surface 38 is the upper member of a structure having a lower chamber therebelow adapted to receive the mechanism of this version of mechanical support. The support again comprise pipe-like body 39 slideably carrying extensible rod 41 in central chamber 40. Compression spring 42 communicates between adjacent surfaces of rod 41 and chamber end to bias the rod to a normally upward position. Body 39 is maintained in an appropriate vertical position in supporting surface 38 by mounting brackets 42.

A positioning dog 43 is threadedly carried by the lower part of extensible rod 41 and projects substantially perpendicularly therefrom through positioning channel 44 in support body 39. Notches 45 are provided in the channel to releaseably position rod 41 in various vertical positions.

The specie of invention of FIGURE 4 is activated by an operator external to tram carrier 11. To use the device the tram is positioned vertically above support 38 and rod 41 is then released to engage the lower surface of the tram carrier, preferably at or near the vertically projected center of mass thereof.

A third specie of our invention is illustrated in FIGURE 5. It includes elongate leaf spring 46 non-rotatably mounted about the lower central portion of supporting frame 13 and extending forwardly past the forwardmost portion of the lower surface of safety frame 16. In its central part, again preferably vertically below the center of mass of the tram carrier, it carries mechanical support 47, again comprising pipe-like body 48 and extensible rod 49, biased by compression spring 50 to an extended position and carrying on its lowermost part frictional foot 51. Body 48 is structurally attached to spring 46 by screw 52 threadedly engaged therebetween. The lowermost member 55 of forward safety support 16 carries catch member 53, having laterally projecting arm 54 adapted to releaseably maintain spring 46 therebelow, as desired.

With this specie of our invention, the operator may depress leaf spring 46 and cause it to be carried under arm 54 of catch 53 thus bringing foot 51 of extensible rod 49 into frictional engagement with the underlying supporting surface 12. By reason of its elasticity, spring 46 may be moved slightly laterally from out of engagement with arm 54 of the catch to release the carrier from engagement with the underlying supporting surface.

From the foregoing description it is to be noted that the mechanism described will tend to stabilize a tram carrier from motion in any direction in a horizontal plane. There may be some slight pivotal motion, especially laterally with reference to direction of tram travel if weight be introduced into the system non-symmetrically about the vertically projected center of mass, but this potentiality remains only slight, as the system is quite rigid and constrained at its upper extension by the tram rope and at its lower extension by the specified mechanism.

Obviously, for our invention to be effective sufficient frictional engagement must be maintained between support 10 and supporting surface 12. In practice we found that the weight of a normal tram carrier 11 is sufficient to create an appropriate force to accomplish this purpose. We have not found it necessary to provide a positive mechanical connection between these members, but such would be within the purview of our invention if necessary.

It should also be noted that within the spirit of our invention a support between tram carrier and an underlying supporting surface could be provided by a member not mechanically carried by either tram carrier or supporting surface, but one extensible therebetween to simultaneously communicate with both members.

It is to be understood that the foregoing description is of a detailed particular character so that a specific embodiment of our invention might be set forth, as required, but it is to be understood that various modifications, changes and multiplications of parts and detail may be resorted to without departing from the spirit, essence or scope of the invention.

Having thusly described our invention, what we desire to protect by Letters Patent, and, what we claim is:

1. A mechanism of the nature aforesaid for stabilizing temporarily stationary movable tram carriers, comprising, in combination: a mechanically movable support biased to an extended position, movable to communicate between a tram carrier and an underlying supporting surface to prevent motion of the tram carrier relative the underlying supporting surface.

2. A mechanism of the nature aforesaid for stabilizing stationary tram carriers, comprising, in combination: a mechanically movable support biased to an extended position, movable to communicate between a tram carrier and an underlying supporting surface to prevent motion of said tram carrier relative the underlying supporting surface, said mechanically movable support including a cylindrical housing having a central orifice carrying an extensible rod, spring biased to an outward position therein, said housing being pivotably mounted on the under surface of a tram carrier to be pivotable into an operative vertical position from a non-operative horizontal position by means of mechanical linkage with the entrance gate of said tram carrier.

3. A mechanism of the nature aforesaid for stabilizing stationary tram carriers, comprising, in combination: a mechanically movable support biased to an extended position, movable to communicate between a tram carrier and an underlying supporting surface to prevent motion of said tram carrier relative the underlying supporting surface, said mechanically movable support including a housing having a central axially aligned channel slidably carrying an extensible foot, spring biased to an extended position, but mechanically movable to a non-extended position, said housing being carried by an underlying supporting surface with said rod being extensible to communicate with the lowermost surface of said tram carrier.

4. A mechanism of the nature aforesaid for stabilizing stationary tram carriers, comprising, in combination: a mechanically movable support biased to an extended position, movable to communicate between a tram carrier and an underlying supporting surface to prevent motion of said tram carrier relative the underlying supporting surface, said mechanically movable support including an elongate leaf spring non-rotatably carried by the lowermost medial portion of a rearward frame member of said tram carrier, said spring extending forwardly to communicate with a catch member adapted to releasably maintain a foot depending from the medial portion of said leaf spring in engagement with a supporting surface thereunder.

References Cited

UNITED STATES PATENTS

| 2,801,121 | 7/1957 | Gervais | 292—192 |
| 3,024,870 | 3/1962 | Kramcsak | 188—5 |

FOREIGN PATENTS 645,846    9/1962    Italy.

ARTHUR L. LA POINT, Primary Examiner

U.S. Cl. X.R.

188—5